United States Patent
Cizek et al.

(10) Patent No.: US 10,060,536 B2
(45) Date of Patent: Aug. 28, 2018

(54) TURBOCHARGER WASTE GATE POPPET VALVE WITH FLEXIBLE SHEET METAL SEALING MEMBER

(71) Applicant: Honeywell International Inc., Morris Plains, NJ (US)

(72) Inventors: Petr Cizek, Brno (CZ); Antonin Forbelsky, Brno (CZ); Stanislav Hahn, Znojmo (CZ); Vit Micanek, Brno (CZ)

(73) Assignee: Garrett Transportation I Inc., Torrance, CA (US)

( * ) Notice: Subject to any disclaimer, the term of this patent is extended or adjusted under 35 U.S.C. 154(b) by 137 days.

(21) Appl. No.: 15/168,120

(22) Filed: May 30, 2016

(65) Prior Publication Data

US 2017/0343114 A1    Nov. 30, 2017

(51) Int. Cl.
| | |
|---|---|
| *F02D 23/00* | (2006.01) |
| *F16K 1/36* | (2006.01) |
| *F02B 37/18* | (2006.01) |
| *F02B 39/00* | (2006.01) |

(52) U.S. Cl.
CPC .............. *F16K 1/36* (2013.01); *F02B 37/183* (2013.01); *F02B 37/186* (2013.01); *F02B 39/00* (2013.01)

(58) Field of Classification Search
CPC ......... F16K 1/36; F02B 37/183; F02B 37/186
USPC ........................................ 251/177, 179, 234
See application file for complete search history.

(56) References Cited

U.S. PATENT DOCUMENTS

| | | | | |
|---|---|---|---|---|
| 2,196,798 | A * | 4/1940 | Horstmann | F16K 1/36 251/334 |
| 3,060,961 | A | 10/1962 | Conley | |
| 3,294,360 | A * | 12/1966 | Lundberg | F16K 1/36 251/205 |
| 3,664,371 | A | 5/1972 | Schneider | |
| 4,088,301 | A * | 5/1978 | Ehmig | F16K 51/02 251/189 |
| 4,351,292 | A | 9/1982 | Worthen et al. | |
| 4,785,844 | A * | 11/1988 | Pankov | F16K 3/184 137/240 |
| 5,782,269 | A | 7/1998 | Seaney et al. | |
| 6,129,105 | A * | 10/2000 | Hec | A62C 4/02 137/75 |
| 2006/0180115 | A1 | 8/2006 | Rubert | |
| 2008/0073605 | A1* | 3/2008 | Ishigaki | F16K 1/36 251/12 |
| 2012/0317975 | A1* | 12/2012 | Schoenherr | F02B 37/183 60/602 |
| 2013/0251565 | A1 | 9/2013 | Russell et al. | |
| 2014/0154100 | A1* | 6/2014 | Zeng | F02M 69/02 417/53 |

FOREIGN PATENT DOCUMENTS

| | | |
|---|---|---|
| DE | 102009050182 A1 | 5/2011 |
| DE | 102012003709 A1 | 8/2013 |
| DE | 102014209666 A1 | 6/2015 |
| EP | 2489853 A1 | 8/2012 |
| EP | 2573363 A2 | 3/2013 |
| WO | 8702113 A1 | 4/1987 |
| WO | 2012146510 A2 | 11/2012 |

OTHER PUBLICATIONS

EPO Search Report and Opinion in EP Appl No. 17170018.0-1603, dated Oct. 10, 2017.

* cited by examiner

*Primary Examiner* — Ngoc T Nguyen
(74) *Attorney, Agent, or Firm* — John C. James

(57) ABSTRACT

A turbocharger waste gate valve includes an elastically deformable sealing member formed by sheet metal, the sealing member being carried on one of the poppet valve member and the valve housing and being arranged to be under compression between the valve seat and the valve member end face when the poppet valve member is in the closed position so as to be elastically deformed into a compressed state, and to be released from said compression so as to return to an uncompressed state when the poppet valve member is in the open position. The sealing member in the compressed state contacts the valve seat about a full circumference thereof and contacts the valve member end face about a full circumference thereof so as to substantially seal any gap between the valve member end face and the valve seat.

6 Claims, 7 Drawing Sheets

TURBOCHARGER WASTE GATE POPPET VALVE WITH FLEXIBLE SHEET METAL SEALING MEMBER

BACKGROUND OF THE INVENTION

The present disclosure relates to exhaust gas-driven turbochargers, and particularly to waste gate poppet valves for turbochargers.

In a conventional turbocharger, the turbine housing defines a bypass conduit located generally to one side of the main bore through the housing, and the bypass conduit is connected to the exhaust gas inlet or the volute of the housing via a bypass valve. The bypass or waste gate valve typically is a swing or poppet style valve comprising a circular valve member that is urged against a flat valve seat surrounding the bypass passage opening. One drawback associated with such an arrangement is that sometimes the face of the poppet valve member is not precisely parallel to the face of the valve seat, such that a gap is formed over part of the circumference through which gas can leak. Leakage past the closed bypass valve is a cause of performance degradation of the turbine and, hence, the turbocharger and its associated engine.

BRIEF SUMMARY OF THE DISCLOSURE

The present disclosure describes various embodiments of turbocharger waste gate valves having a sheet metal sealing member that seeks to address issues such as the ones noted above. In one embodiment, a turbocharger waste gate valve comprises: a housing defining an exhaust gas inlet through which exhaust gases are received, the housing defining a primary flow passage for the exhaust gases and a bypass flow passage that branches off the primary flow passage;

a substantially planar, annular valve seat encircling the bypass flow passage;

a poppet valve member connected to a swing arm, the swing arm being pivotable about a pivot axis for moving the poppet valve member between a closed position and an open position with respect to the valve seat, the poppet valve member defining a valve member end face that is arranged to confront the valve seat in the closed position of the poppet valve member; and an elastically deformable sealing member formed by sheet metal, the sealing member being carried on one of the poppet valve member and the housing and being arranged to be under compression between the valve seat and the valve member end face when the poppet valve member is in the closed position so as to be elastically deformed into a compressed state, and to be released from said compression so as to return to an uncompressed state when the poppet valve member is in the open position, the sealing member in the compressed state contacting the valve seat about a full circumference thereof and contacting the valve member end face about a full circumference thereof so as to substantially seal any gap between the valve member end face and the valve seat.

In some embodiments of the invention the sealing member is carried on the valve member and has a disk configuration covering at least substantially all of the valve member end face. For example, in one embodiment the sealing member is spot-welded to the valve member end face at a generally central point of the valve member end face but otherwise is substantially free of welded attachment to the valve member. The sealing member can be configured such that it is an outer peripheral edge of the sealing member that contacts the valve member end face about said full circumference thereof.

Alternatively the sealing member can be configured such that it is an outer peripheral edge of the sealing member that contacts the valve member end face about said full circumference thereof, and said full circumference of the valve seat is contacted by a portion of the sealing member located radially inward of the outer peripheral edge.

In another embodiment of the invention, the valve member has a back face opposite from the end face and a substantially cylindrical outer face extending between the back face and the end face, and the sealing member has an outer peripheral portion that is bent to extend along the cylindrical outer face and onto the back face so as to affix the sealing member to the valve member without welding.

In still another embodiment, the sealing member is carried on the valve member and is annular, having a radially outer edge and a radially inner edge, wherein the sealing member is attached by welding to the valve member about the entire outer edge, and it is the radially inner edge of the sealing member that contacts the valve seat about said full circumference thereof.

In yet another embodiment of the invention, the sealing member is carried on the housing and is annular, having a radially outer edge and a radially inner edge, wherein the sealing member has a bent portion at the radially inner edge for affixing the sealing member about the valve seat without welding, and wherein it is the radially outer edge of the sealing member that contacts the valve member end face about the full circumference thereof.

In accordance with the invention in its various embodiments (which are not limited to the embodiments expressly described herein), the flexibility and resilience of the sealing member enable the sealing member to compensate for any misalignment of the valve member (i.e., non-parallel relationship between the valve seat and the valve member end face) and/or any thermal deformation that can cause the valve seat to deform from its ideal planar configuration so as to have a wavy or non-planar shape.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present disclosure now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
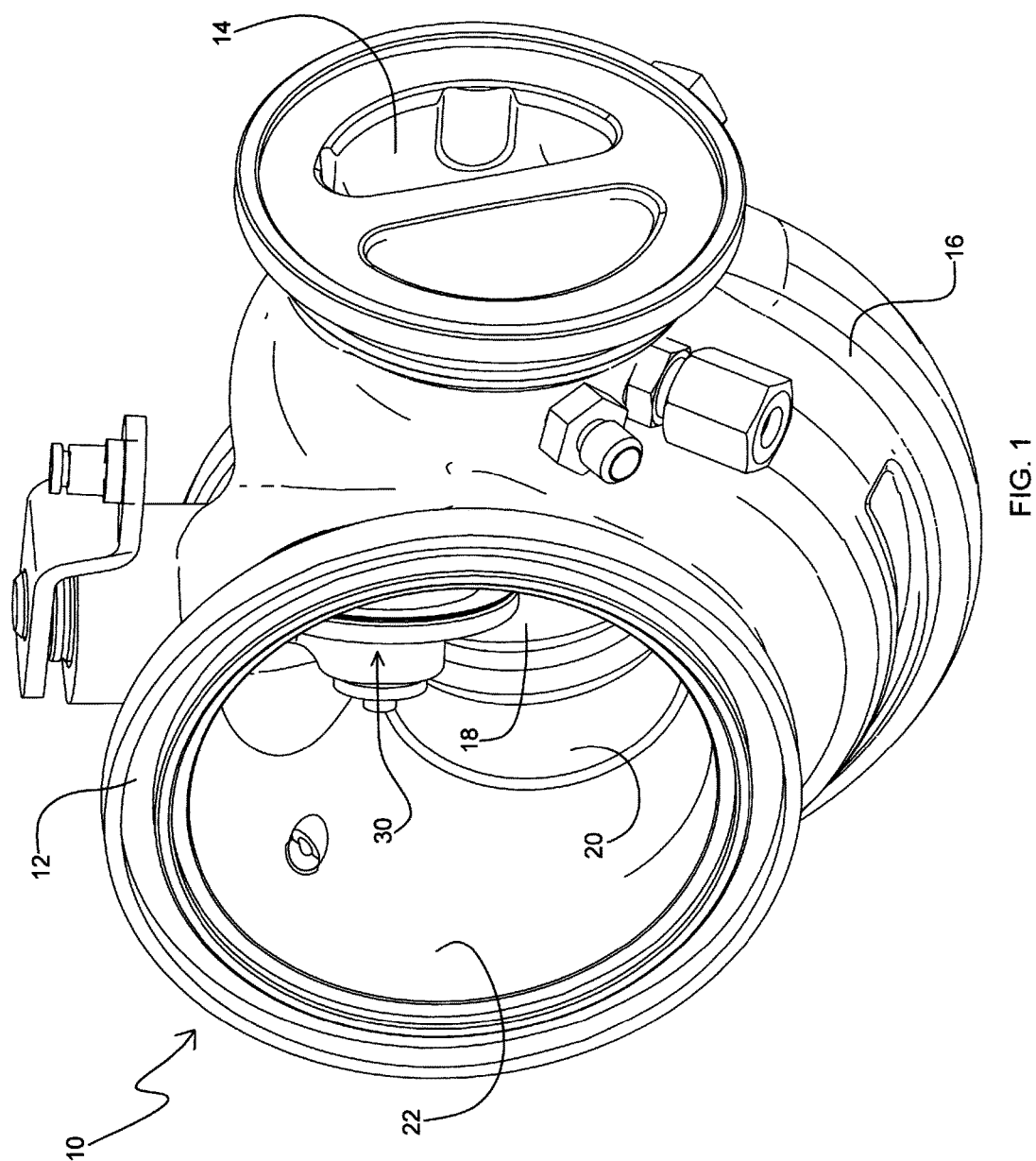
FIG. 1 is perspective view of a turbocharger waste gate valve in accordance with prior art.
Figure 2:
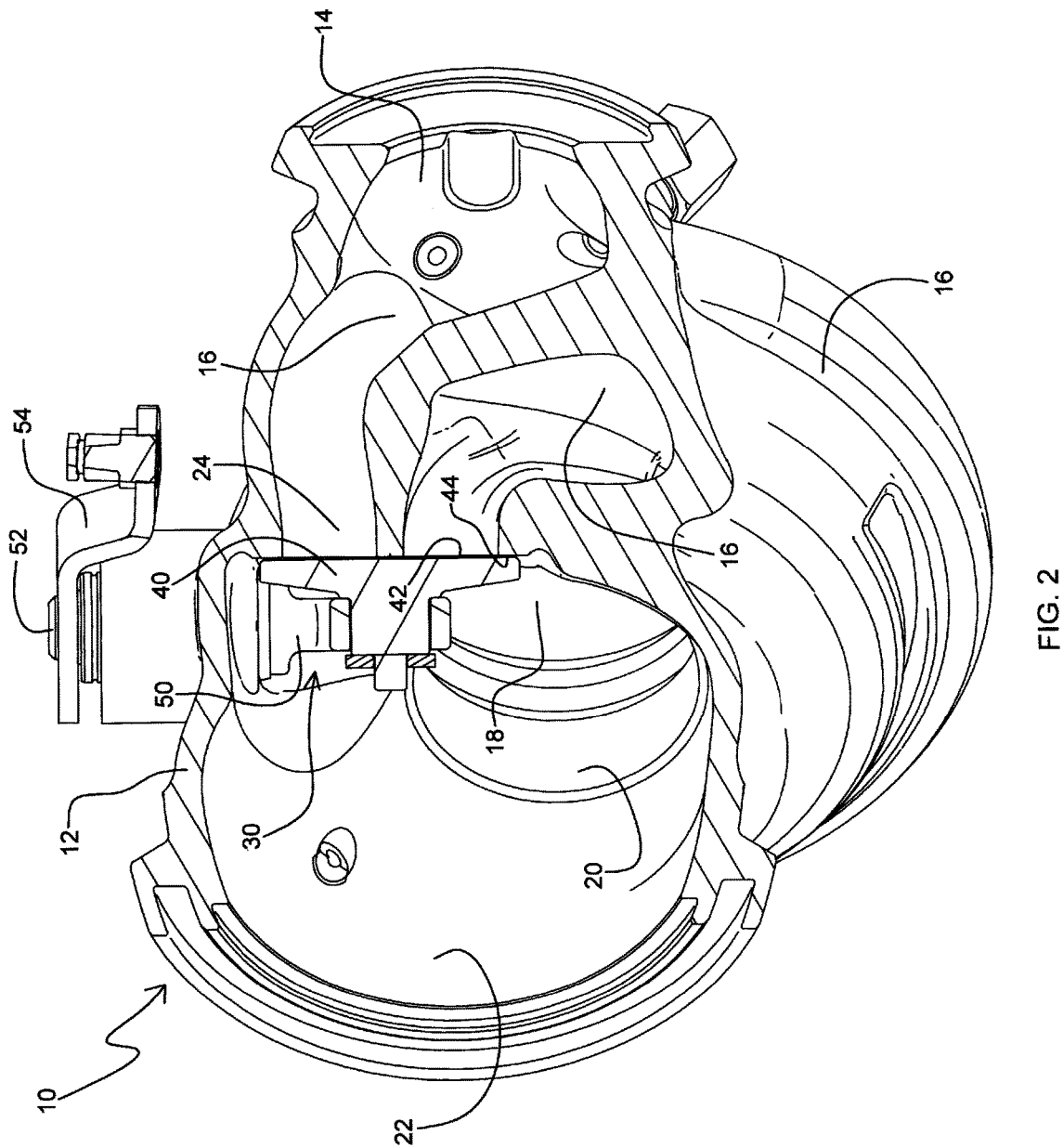
FIG. 2 is a perspective view of the waste gate valve of FIG. 1 but also sectioned to show details of the poppet and valve seat.

A turbocharger waste gate valve 10 in accordance with the prior art is shown in FIGS. 1 and 2. The waste gate valve includes a housing 12. In the illustrated embodiment the housing 12 is an integral turbine housing and valve housing formed as a one-piece integral structure. The housing defines an exhaust gas inlet 14 that receives exhaust gases from an internal combustion engine. The exhaust gas inlet 14 is in fluid communication with a generally annular volute 16 such that exhaust gases received in the inlet 14 are fed into the volute 16 for supply to a turbine wheel (not shown) contained within an interior 18 of the housing. Gases that have passed through the turbine wheel are discharged into an axial bore 20 defined by the housing, and from the bore 20 the gases flow into a further space 22 defined in the housing downstream from the bore.

The housing 12 further defines a bypass passage 24 that is in fluid communication with the exhaust gas inlet 14 and is also connected to the space 22 downstream of the axial bore 20. A waste gate or bypass valve 30 is disposed within the housing and operates to open or close so as to either allow or prevent exhaust gases from passing through the bypass passage 24 into the space 22. Thus, when the waste gate is open, a portion of the exhaust gases received into the inlet 14 bypass the turbine wheel and flow directly into the space 22. When the waste gate is closed as shown in FIG. 2, the intention is for all of the exhaust gases that enter the exhaust gas inlet 14 to pass into the volute 16 and then be directed through the turbine wheel. However, there are a number of factors that can allow some exhaust gas to leak past the closed waste gate, as explained below with reference to FIG. 2.

The waste gate 30 comprises a poppet valve member 40 that is carried on a swing arm 50. The swing arm is affixed to a rotary shaft 52 that passes through a journal bearing (not visible in FIG. 2), and the shaft 52 is affixed to a lever arm 54. By pivoting the lever arm 54, the shaft 52 is rotated about its axis, which causes the poppet valve member 40 to swing along an arc between its open position and its closed position shown in FIG. 2. The end face 42 of the poppet valve member is intended to abut a valve seat 44 formed by the housing 12. The valve seat encircles the bypass passage 24. The objective is for a full circumference of the poppet valve end face 42 to make contact with a full circumference of the valve seat 44. However, sometimes the end face 42 of the poppet valve member is misaligned (for example, through a manufacturing defect such as failure to meet the manufacturing specification) such that it is not parallel to the valve seat 44, which results in a gap along part of the circumference of the valve seat, and exhaust gases leak through that gap. This non-parallelism of the valve member relative to the valve seat is particularly likely to occur when the poppet valve member 40 and the arm 50 are a one-piece integral construction (also known as a "monoblock" construction), because then there is no ability of the valve member 40 to rock slightly relative to the arm 50 so as to become parallel with the valve seat 44. Additionally, thermal deformation of the housing 12 can cause the valve seat 44 to become non-planar, such as wavy, again resulting in one or more gaps through which exhaust gases can leak. Leakage of exhaust gases past the waste gate is harmful to the overall efficiency of the turbine because the leakage flow does not contribute to the power produced by the turbine wheel.

The present invention is aimed at mitigating such exhaust gas leakage. In accordance with the invention, an elastically deformable sealing member formed by sheet metal is carried on one of the poppet valve member 40 and the housing 12 and is arranged to be under compression between the valve seat 44 and the valve member end face 42 when the poppet valve member is in the closed position so as to be elastically deformed into a compressed state, and to be released from said compression so as to return to an uncompressed state when the poppet valve member is in the open position. The sealing member in the compressed state contacts the valve seat 44 about a full circumference thereof and contacts the valve member end face 42 about a full circumference thereof so as to substantially seal any gap between the valve member end face and the valve seat.

Figure 3:
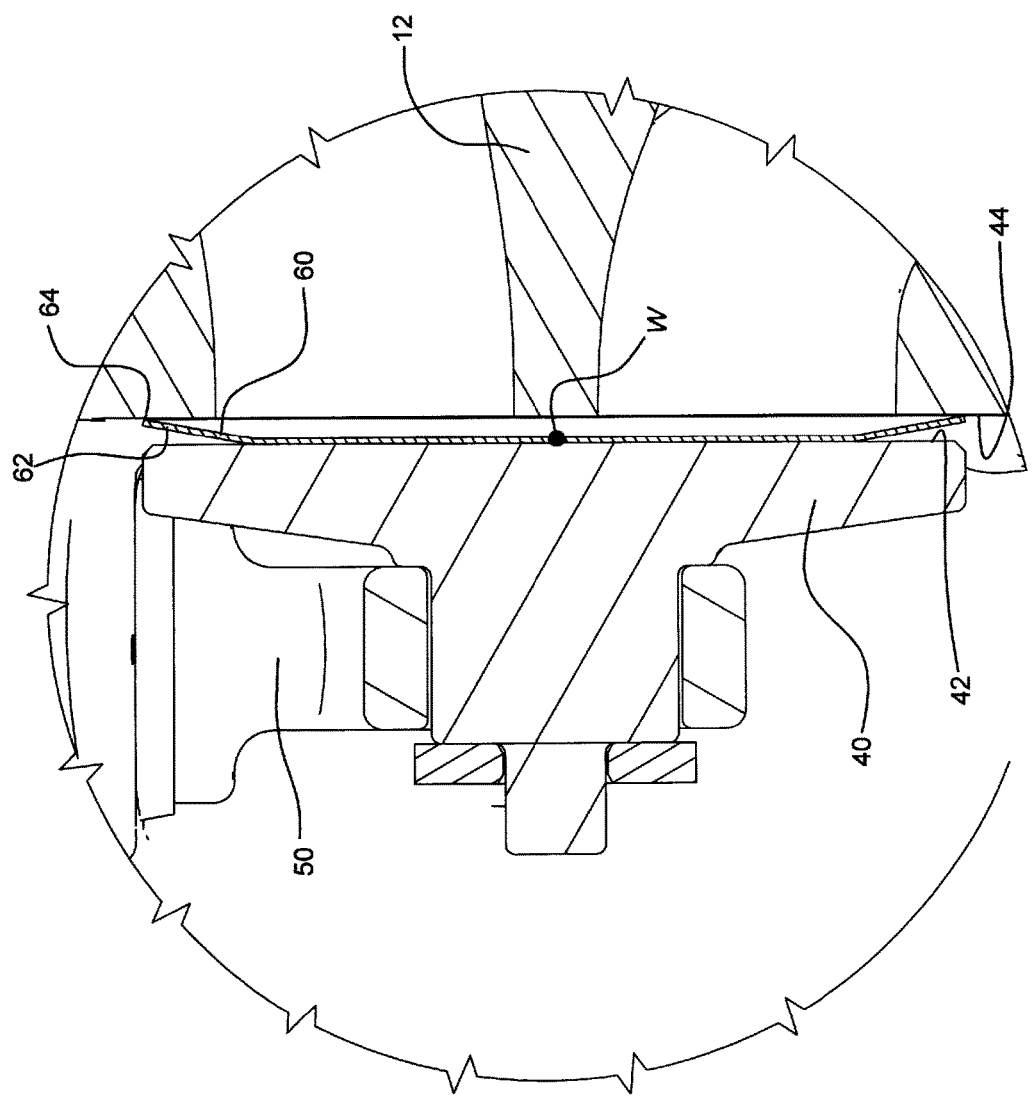
FIG. 3 is a cross-sectional view of a waste gate valve in accordance with a first embodiment of the invention.

Thus, with reference to FIG. 3, a first embodiment of the invention is illustrated. In this embodiment a disc-shaped sealing member 60 is affixed to the poppet valve member 40 and covers substantially all of the end face 42 thereof. The peripheral region 62 of the sealing member has a bent configuration, bent away from the end face 42 of the poppet valve member toward the valve seat 44. The affixation of the sealing member to the poppet valve member does not occur over all of the surface area of the sealing member. Rather, the sealing member is affixed to the poppet valve member in such a manner that at least the peripheral region 62 is free from affixation to the poppet valve member. In the illustrated embodiment, the affixation of the sealing member to the poppet valve member is accomplished by a single spot weld W located substantially at a center of the sealing member; however, other types and/or configurations of affixation regions can be used instead. In the embodiment of FIG. 3, the sealing member 60 is configured such that it is an outer peripheral edge 64 of the sealing member that contacts the valve seat about said full circumference thereof. When the poppet valve member 40 is swung to the closed position by the arm 50, the outer peripheral edge of the sealing member makes contact with the valve seat 44 and further movement of the poppet valve member toward the seat causes the outer peripheral region to be compressed so that any gap that otherwise would have occurred because of non-parallelism of the poppet valve relative to the valve seat is closed up by the sealing member. In other words, the sealing member has enough elastic compressibility to compensate for any gap(s) that otherwise would occur.

Figure 4:
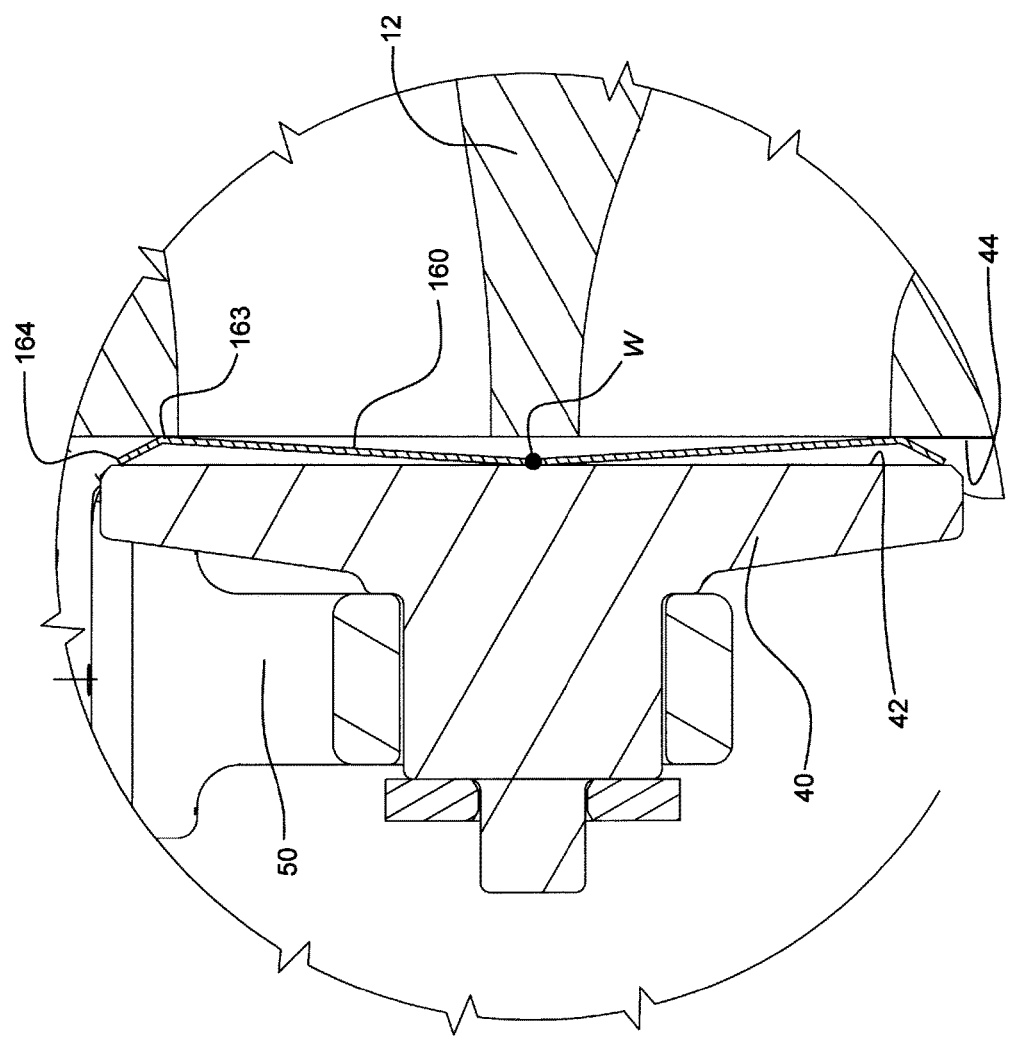
FIG. 4 is a cross-sectional view of a waste gate valve in accordance with a second embodiment of the invention.

A second embodiment of the invention is depicted in FIG. 4, and is generally similar to the previous embodiment. An elastically deformable sealing member 160 of disc-shaped configuration is carried on the poppet valve member 40 and is affixed to the end face 42 by a single spot weld W or is otherwise affixed at a generally central point of the sealing member such that the sealing member over most of its surface area has no affixation to the end face. The sealing member in its relaxed state has a generally M-shaped configuration in cross section. An outer peripheral edge 164 of the sealing member contacts the poppet valve member end face 42 about a full circumference thereof, and the sealing member is bent such that a region 163 of the sealing member spaced radially inward from the outer edge contacts the valve seat 44 about a full circumference thereof when the poppet valve member is in the closed position of FIG. 4. When the poppet valve member 40 is swung to the closed position by the arm 50, the region 163 of the sealing member makes contact with the valve seat 44 and consequently the outer edge 164 is pushed against the end face 42 of the poppet valve member; further movement of the poppet valve member toward the seat causes the sealing member to be compressed so that any gap that otherwise would have occurred because of non-parallelism of the poppet relative to the valve seat is closed up by the sealing member.

Figure 5:
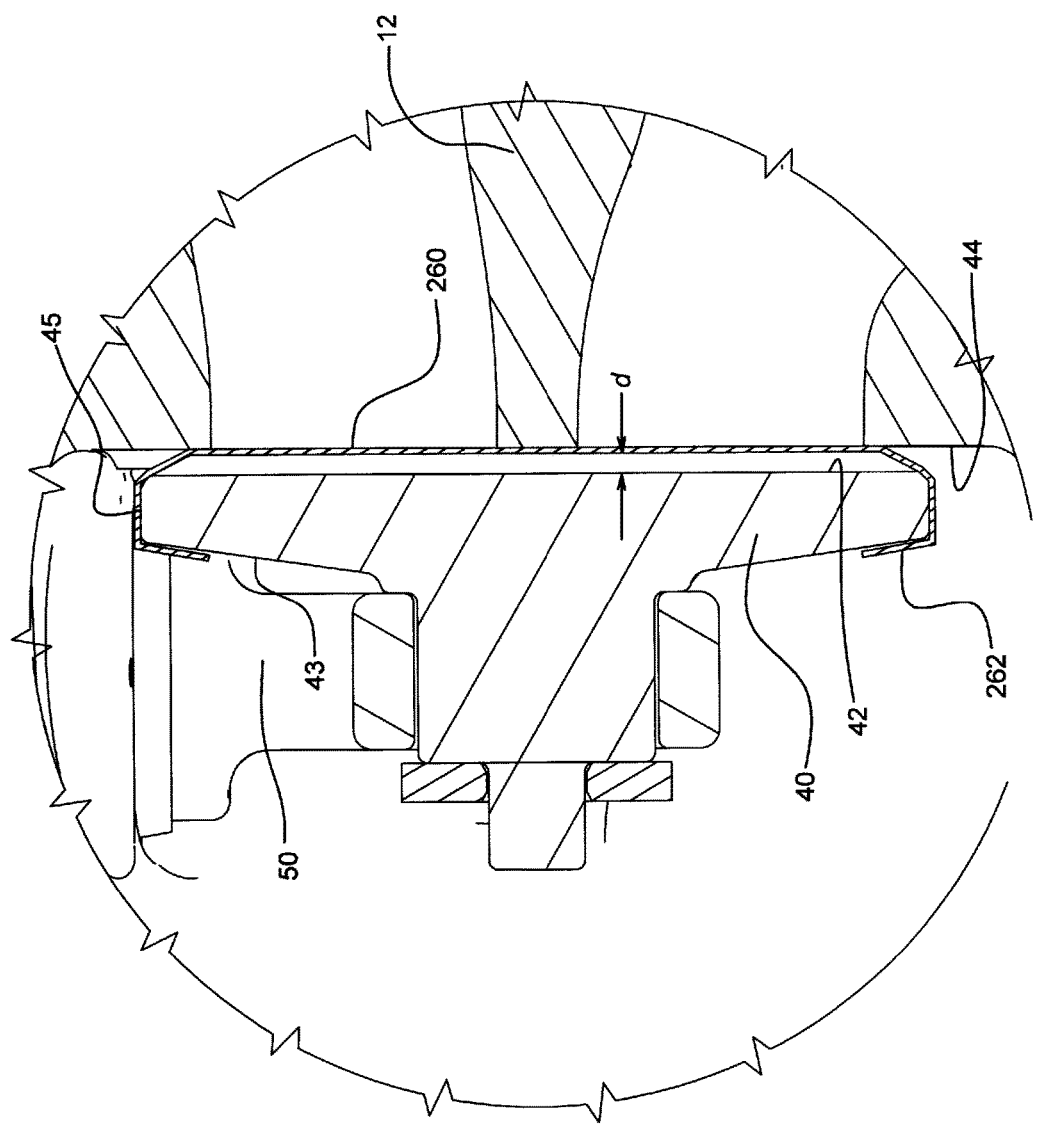
FIG. 5 is a cross-sectional view of a waste gate valve in accordance with a third embodiment of the invention.

FIG. 5 depicts a third embodiment of the invention. An elastically deformable sealing member 260 is carried on the poppet valve member 40 as in the prior embodiments. However, unlike the prior embodiments, the sealing member 260 is not welded to the poppet valve member, but rather is affixed to the poppet valve member by a bent outer peripheral region. The poppet valve member has a back face 43 opposite from the end face 42 and a substantially cylindrical outer face 45 extending between the back face 43 and the end face 42, and the sealing member 260 has an outer peripheral portion 262 that is bent to extend along the cylindrical outer face and onto the back face so as to affix the sealing member to the valve member without welding. The sealing member is configured such that it stands off the poppet valve end face 42 by a gap d. When the poppet valve member 40 is swung to the closed position by the arm 50, the sealing member makes contact with the valve seat 44 and if there is any non-parallelism between the valve member end face 42 and the valve seat 44, the sealing member is compressed so that any gap that otherwise would have occurred is closed up through compensating deformation of the sealing member.

Figure 6:
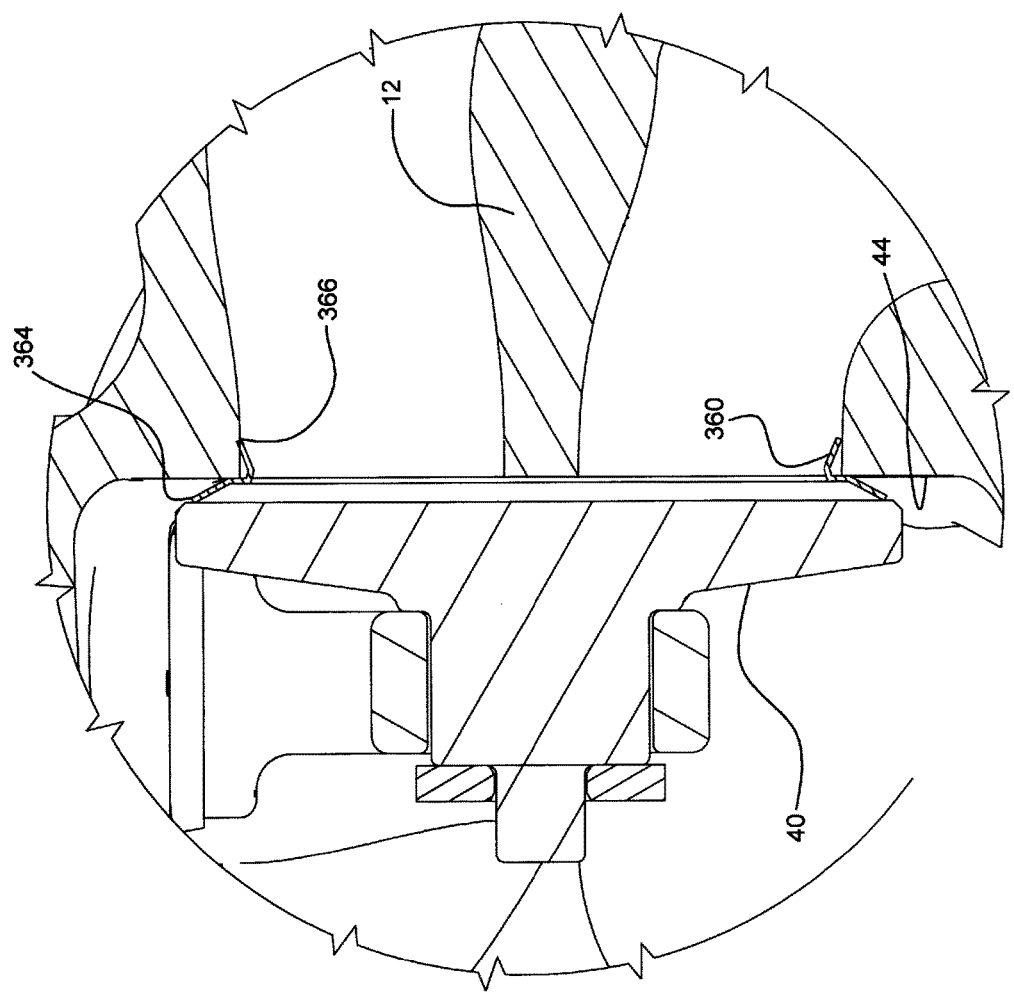
FIG. 6 is a cross-sectional view of a waste gate valve in accordance with a fourth embodiment of the invention.
Figure 7:
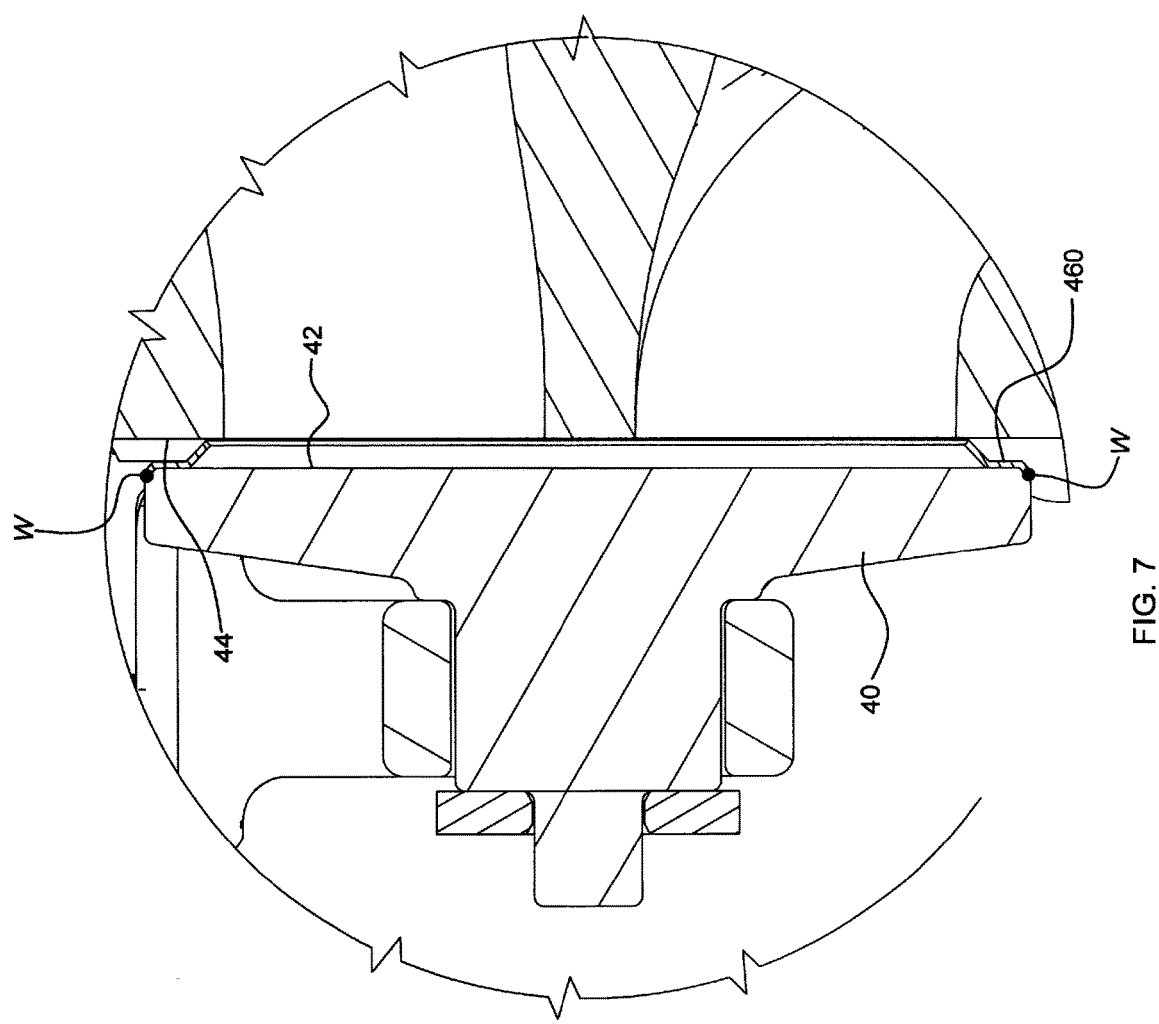
FIG. 7 is a cross-sectional view of a waste gate valve in accordance with a fifth embodiment of the invention.

FIGS. 6 and 7 depict fourth and fifth embodiments, respectively, in which a generally annular sealing member is employed rather than a full disc-shaped sealing member. In the fourth embodiment of FIG. 6, an annular sealing member 360 is carried on the housing 12 and has a radially outer edge 364 and a radially inner edge 366. The sealing member has a bent portion at the radially inner edge for affixing the sealing member about the valve seat 44 without welding, and it is the radially outer edge 364 of the sealing member that contacts the valve member end face 42 about a full circumference thereof. When the poppet valve member 40 is swung to the closed position, the valve member end face 42 makes contact with the outer edge 364 of the sealing member and if there is any non-parallelism between the valve member end face 42 and the valve seat 44, the sealing member is compressed so that any gap that otherwise would have occurred is closed up through compensating deformation of the sealing member.

The fifth embodiment of FIG. 7 employs a sealing member 460 of annular configuration affixed to the poppet valve member 40. The sealing member has a radially outer edge and a radially inner edge, and the sealing member is attached by welding W to the valve member at the outer edge. The radially inner edge of the sealing member is bent away from the valve member end face 42 and contacts the valve seat 44 about a full circumference thereof. When the poppet valve member 40 is swung to the closed position, the inner edge of the sealing member contacts the valve seat 44 and if there is any non-parallelism between the valve member end face 42 and the valve seat, the sealing member is compressed so that any gap that otherwise would have occurred is closed up through compensating deformation of the sealing member.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger waste gate valve comprising:
   a housing defining an exhaust gas inlet through which exhaust gases are received, the housing defining a primary flow passage for the exhaust gases and a bypass flow passage that branches off the primary flow passage;
   a planar, annular valve seat encircling the bypass flow passage;
   a poppet valve member connected to a swing arm, the swing arm being pivotable about a pivot axis for moving the poppet valve member between a closed position and an open position with respect to the valve seat, the poppet valve member defining a valve member end face that is arranged to confront the valve seat in the closed position of the poppet valve member; and
   an elastically deformable sealing member formed by sheet metal, the sealing member being carried on the poppet valve member and being arranged to be under compression between the valve seat and the valve member end face when the poppet valve member is in the closed position so as to be elastically deformed into a compressed state, and to be released from said compression so as to return to an uncompressed state when the poppet valve member is in the open position, the sealing member in the compressed state contacting the valve seat about a full circumference thereof and contacting the valve member end face about a full circumference thereof so as to seal any gap between the valve member end face and the valve seat, wherein the sealing member has a disk configuration covering at least all of the valve member end face, and the sealing member is spot-welded to the valve member end face at a central point of the valve member end face but otherwise is free of welded attachment to the valve member.

2. The turbocharger waste gate valve of claim 1, wherein the sealing member is configured such that it is an outer peripheral edge of the sealing member that contacts the valve seat about said full circumference thereof.

3. The turbocharger waste gate valve of claim 1, wherein the sealing member is configured such that it is an outer peripheral edge of the sealing member that contacts the valve member end face about said full circumference thereof, and said full circumference of the valve seat is contacted by a portion of the sealing member located radially inward of the outer peripheral edge.

4. A turbocharger waste gate valve comprising:
   a housing defining an exhaust gas inlet through which exhaust gases are received, the housing defining a primary flow passage for the exhaust gases and a bypass flow passage that branches off the primary flow passage;
   a planar, annular valve seat encircling the bypass flow passage;
   a poppet valve member connected to a swing arm, the swing arm being pivotable about a pivot axis for moving the poppet valve member between a closed position and an open position with respect to the valve seat, the poppet valve member defining a valve member end face that is arranged to confront the valve seat in the closed position of the poppet valve member; and
   an elastically deformable sealing member formed by sheet metal, the sealing member being carried on the poppet valve member and being arranged to be under compression between the valve seat and the valve member end face when the poppet valve member is in the closed position so as to be elastically deformed into a compressed state, and to be released from said compression so as to return to an uncompressed state when the poppet valve member is in the open position, the sealing member in the compressed state contacting the valve seat about a full circumference thereof and contacting the valve member end face about a full circumference thereof so as to seal any gap between the valve member end face and the valve seat, wherein the sealing member has a disk configuration covering the valve member end face, and wherein the valve member has a back face opposite from the end face and a cylindrical outer face extending between the back face and the end face, and the sealing member has an outer peripheral portion that is bent to extend along the cylindrical outer face and onto the back face so as to affix the sealing member to the valve member without welding.

5. A turbocharger waste gate valve comprising:

a housing defining an exhaust gas inlet through which exhaust gases are received, the housing defining a primary flow passage for the exhaust gases and a bypass flow passage that branches off the primary flow passage;

a planar, annular valve seat encircling the bypass flow passage;

a poppet valve member connected to a swing arm, the swing arm being pivotable about a pivot axis for moving the poppet valve member between a closed position and an open position with respect to the valve seat, the poppet valve member defining a valve member end face that is arranged to confront the valve seat in the closed position of the poppet valve member; and an elastically deformable sealing member formed by sheet metal, the sealing member being carried on the poppet valve member and being arranged to be under compression between the valve seat and the valve member end face when the poppet valve member is in the closed position so as to be elastically deformed into a compressed state, and to be released from said compression so as to return to an uncompressed state when the poppet valve member is in the open position, the sealing member in the compressed state contacting the valve seat about a full circumference thereof and contacting the valve member end face about a full circumference thereof so as to seal any gap between the valve member end face and the valve seat, wherein the sealing member is annular, having a radially outer edge and a radially inner edge, wherein the sealing member is attached by welding to the valve member at the outer edge, and it is the radially inner edge of the sealing member that contacts the valve seat about said full circumference thereof.

6. A turbocharger waste gate valve comprising:

a housing defining an exhaust gas inlet through which exhaust gases are received, the housing defining a primary flow passage for the exhaust gases and a bypass flow passage that branches off the primary flow passage;

a planar, annular valve seat encircling the bypass flow passage;

a poppet valve member connected to a swing arm, the swing arm being pivotable about a pivot axis for moving the poppet valve member between a closed position and an open position with respect to the valve seat, the poppet valve member defining a valve member end face that is arranged to confront the valve seat in the closed position of the poppet valve member; and an elastically deformable sealing member formed by sheet metal, the sealing member being arranged to be under compression between the valve seat and the valve member end face when the poppet valve member is in the closed position so as to be elastically deformed into a compressed state, and to be released from said compression so as to return to an uncompressed state when the poppet valve member is in the open position, the sealing member in the compressed state contacting the valve seat about a full circumference thereof and contacting the valve member end face about a full circumference thereof so as to seal any gap between the valve member end face and the valve seat, wherein the sealing member is carried on the housing and is annular, having a radially outer edge and a radially inner edge, wherein the sealing member has a bent portion at the radially inner edge for affixing the sealing member about the valve seat without welding, and wherein it is the radially outer edge of the sealing member that contacts the valve member end face about the full circumference thereof.

* * * * *